Aug. 9, 1932.                G. HERBSTER                1,871,267
                        TEMPERATURE REGULATOR
                        Filed April 24, 1930
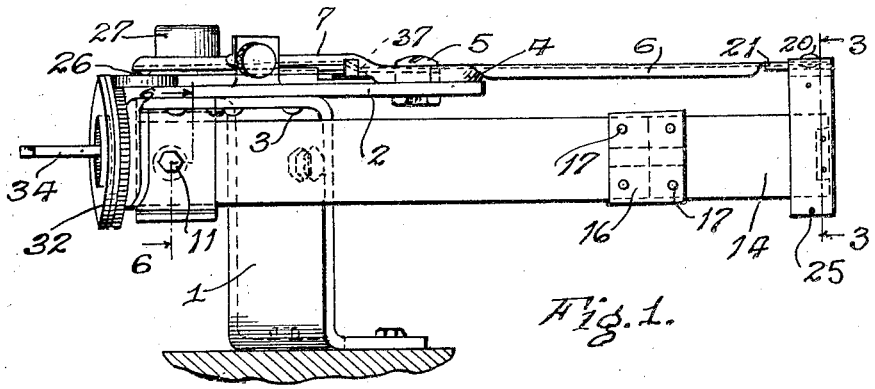
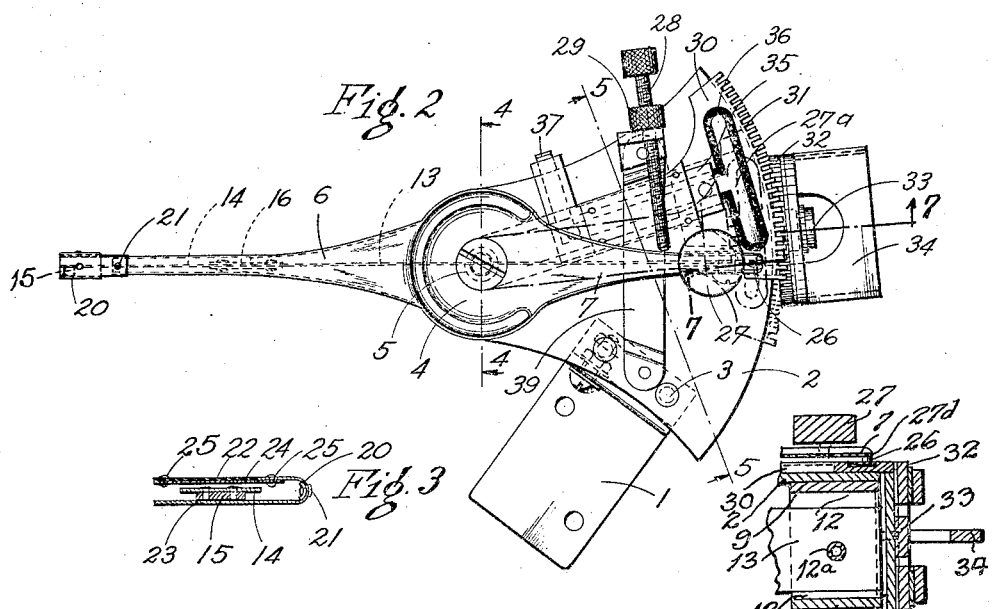
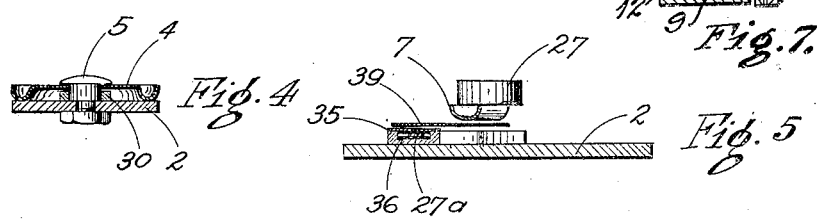
Inventor
George Herbster
By Arthur H. Van Horn
His Attorney Patented Aug. 9, 1932

1,871,267

UNITED STATES PATENT OFFICE

GEORGE HERBSTER, OF CLEVELAND, OHIO, ASSIGNOR TO THE BAUER IGNITION COMPANY, OF CLEVELAND, OHIO, A CORPORATION OF OHIO

TEMPERATURE REGULATOR

Application filed April 24, 1930. Serial No. 447,029.

My invention is an improvement in automatic temperature regulators.

The present invention relates particularly to an automatic control and regulator for such devices as gas ranges, water heaters, furnaces and the like, in which the electric igniter is utilized to ignite fuel and in which a suitable fuel valve is employed to automatically control the fuel flow to one or more burners. The invention, however, may likewise be applied to refrigerators or other apparatus in which temperatures above or below room temperatures are encountered.

One of the objects of my invention consists in automatically controlling the temperature in an enclosed or open area by automatically regulating the means for producing a desired temperature.

Another object of the invention is to thermostatically control a plurality of electrical circuits employed in connection with means for producing relatively high or low temperatures.

A further object of the invention consists in automatically and continuously maintaining any one of a number of predetermined temperatures in a substantially closed area, economically and accurately.

A still further object of the invention is to thermostatically and momentarily control an electric circuit, such as an igniter or motor circuit, and simultaneously control another electric circuit regulating a fuel or other fluid valve or supply system. For example, where my invention is applied to regulate and maintain constant temperatures in an oven of a gas range, the thermostatic control is arranged to momentarily energize an ignition circuit to light the burner and simultaneously energize a circuit for regulating the fuel feed to the burner.

In this manner, if the desired temperature once attained varies slightly the apparatus promptly responds to correct the condition and bring the temperature back to that for which the apparatus is adjusted.

Another object of the invention is to construct a simple, durable control of the above named character which may be easily applied in use and which is economical and accurate in use.

Other objects and advantages of the invention will become more apparent from the following description of the embodiment thereof, reference being made to the accompanying drawing in which like reference characters are employed to designate like parts throughout the same.

In the drawing—

Figure 1 is a side elevation illustrating an embodiment of my invention.

Figure 2 is a top plan view of the same, certain of the parts being shown in dotted lines to indicate their relative positions under certain conditions.

Figure 3 is a section taken on line 3—3 of Figure 1.

Figure 4 is a section taken on line 4—4 of Figure 2.

Figure 5 is a section taken on line 5—5 of Figure 2.

Figure 6 is a section taken on line 6—6 of Figure 1.

Figure 7 is a section taken on line 7—7 of Figure 2 indicating the parts shown in dotted line positions.

Referring more in detail to the drawing, in Figures 1 and 2, I have shown a supporting bracket 1 for securing the automatic control to an oven wall or the like. A plate 2 is secured to the bracket by means of rivets 3 and carries a lever 4 loosely pivoted to the plate at 5. The lever comprises an enlarged area about its fulcrum and includes oppositely extending arms 6 and 7. Rigidly anchored near one edge of the plate and electrically insulated therefrom is a thermostatic element of the usual bi-metallic type. An end of this thermostat is secured to a bracket 9 carried by the plate, by means of a plate 10 and the bolt and nut 11. The bolt and nut, are, of course, electrically insulated from the bracket by a mica sheet 12 and a sleeve 12a and serve as a binding post for connection to one of the electrical circuits.

The thermostatic element extends forwardly of the bracket in a plane passing preferably through the pivot point 5. It will be noted in the embodiment illustrated the thermostatic element comprises a plurality of bonded sections of different gauge and having different co-efficients of expansion and contraction. For instance, the section 13 anchored at one end to the bracket 9 is of heavier gauge than the section 14 bonded thereto and carrying a contact 15 at its outer end. The sections are bonded together by means of a strap 16 and rivets 17 as shown more clearly in Figure 1. In this manner, I have provided a type of compound thermostat, the free end of which is more quickly responsive to variations in temperature than the main body portion thereof, thus materially increasing the sensitiveness of the device and enabling the same to open and close an electric circuit within very slight variations of temperature, as for instance, one or two degrees of temperature or as little as a fraction of a degree.

I have provided means for normally engaging the contact 15 with a second contact and for restricting the relative movement of these contacts away from each other when the thermostat responds to a variation in temperature. This means includes the arm 6 of the lever which extends forwardly in the direction of the thermostatic element. The end of this arm carries a yoke or housing pivotally connected thereto as at 21. The housing comprises the side walls 22 and 23 extending downwardly and housing the contact end of the element 14. One of the walls 22 carries an insulator strip 24 riveted thereto as at 25 to prevent electrical contact between this wall and the element 14 when the latter moves in response to a rise in temperature. The other side wall 23 is engageable in electric contact with the contact 15.

It will be noted that the compound thermostatic element is capable of wide deflection and that the pivoted housing serves to properly align the side walls 22 and 23 with the end of the element 14 during such deflection so that the contacts will be brought into proper engagement without premature contact as might occur if the end of the element were allowed to assume a position at an appreciable angle to the walls 22 and 23.

The arm 7 of the lever or rocker arm extends rearwardly in substantial alignment with the arm 6 and terminates in a contact 26. A counter weight 27 may be carried on the arm 7 to assist the contact 26 into engagement with the contact strip 27a. I have provided adjustable means consisting of a screw 28 and lock nut 29 for applying an initial tension on the lever 4 when the element 14 is under room temperature. In this manner the contacts 15 and 23 are normally engaged under slight pressure at room temperature.

I have also provided means for simultaneously controlling another independent electric circuit upon a variation in temperature to a predetermined degree. This means is capable of adjustment so that the circuit may be opened or closed at a predetermined temperature within a relatively wide range such as for instance, temperatures employed in baking, roasting, slow roasting and steaming.

In carrying out this phase of my invention, I employ a movable contact carrying member 30 pivoted at 5 and slidable over the plate 2. The outer edge of the member 30 is toothed as at 31, the teeth extending beyond the plate and meshing with the teeth of a pinion 32 rotatable about a pin 33. The pinion is pivoted with a wing 34 by which the operator may grasp and turn the same to adjust the member 30 to a predetermined position on the plate 2.

In this connection I desire to point out that a rod (not shown) may be connected to the pinion 32 for remote control, the outer end of the rod extending through a wall of the inclosure such as an oven and having a knob or dial thereon by which the operator may determine the relative positions of the plate and member 30 without opening the inclosure. In this manner the device may be set so that the limit of movement of the contact 26 in engagement with the strip 27a and consequently the make and break of the contact relative to the position of the thermostatic element, may be predetermined without opening the enclosure.

The contact strip 27a is insulated from the member 30 and the cover plate 35 throughout its length by means of insulation 36, and terminates in a lug or binding post 37 to which one side of the second electrical circuit is connected. The other side is, of course, electrically grounded to the frame or plate 2 of the apparatus and the contact 26. The first circuit already referred to is likewise grounded at one side to the frame or body of the apparatus.

The member 30 is limited in its movement on the plate 2 by means of a strap 39 riveted at its ends to the latter.

Since the invention is capable of a wide range of uses, some of which have been referred to herein, I will describe the operation of the invention as applied to gas ranges having an oven and in which it is desired to fully automatically control the temperature in the oven so that a constant predetermined temperature may be maintained therein.

The device is mounted preferably upon a wall of the oven and is connected to electrically operate an igniter for the burner and to electrically control the gas flow to the burner. The frame or body of the device is grounded to the ground side of these circuits. A lead from the igniter is connected to the binding post 11 while a lead from the gas control valve (not shown) is connected to the binding post 37. Since the contact 15 on the end of the thermostat 14 is connected to the binding post 11 and since the contact normally abuts the metal wall 23 of the housing 20 as shown in Figure 3, the ignition circuit is complete to a switch carried by a burner hand valve (not shown).

The operator now turns the pinion preferably by means of an indicator knob mounted on an outer wall of the oven and directly connected with the pinion, until the knob indicates the temperature desired in the oven. By thus turning the pinion the member 30 is shifted on the plate 2 to a predetermined position with the contact 26 in engagement with the upper surface of the strip 27a, and completing the electrical circuit through the gas control valve (not shown). In this manner the valve will be opened and gas admitted to the burner hand valve.

When the operator wishes to ignite the oven burner he turns the hand valve, as is the usual custom, which closes the contacts in the valve switch and completes the ignition circuit, whereupon a spark at the burner will ignite the gas admitted through the hand valve.

As the temperature begins to rise in the oven the compound thermostatic element will be deflected in a clockwise direction in Figure 2, instantaneously separating the contact 15 from the metal wall 23 of the housing to open the ignition circuit. Further deflection of the thermostat will engage its end with the insulated wall of the housing 20 moving the housing and lever about the pivot 5.

The arm 7 is thus moved also in a clockwise direction in Figure 2 causing the contact 26 to travel along and in engagement with the strip 27a toward an end thereof. When the temperature in the oven exceeds to the temperature indicated by the position of the knob, the contact will have been moved past the edge of the contact strip 27a and out of engagement therewith, thereby opening the fuel valve circuit and closing the valve to shut off fuel to the burner. Under these circumstances the temperature in the oven will drop slightly whereupon the thermostat will respond by movement in the reverse direction to again close the ignition circuit. It will be noted that because of the restricted free relative movement between the free end of the thermostat and the opposite side walls of the housing 20, a very slight movement of the former is sufficient to engage it with the metal wall of the housing. Such a slight movement represents a very slight drop in temperature in the oven because the forward section of the thermostat possesses such a co-efficient of expansion and contraction as will enable it to respond to a variance in temperature of but one or two degrees. Substantially simultaneously with the re-energization of the ignition circuit by a reverse movement of the thermostat and lever 7, the contact 26 is again brought into electrical engagement with the strip 27a to re-energize the valve control circuit to open the valve and admit gas to the burner to be ignited.

It will be seen that by this means a substantially continuous predetermined temperature may be automatically maintained in an enclosed area such as an oven without attention of the operator after he has once set the knob to indicate the desired temperature and has opened the hand valve. When it is desired to discontinue the operation of the oven for any period of time the operator merely closes the hand valve.

Various predetermined temperatures may be maintained substantially continuously in an oven by simply turning the knob or pinion 32 to the desired indicated temperature. Thus if it is desired to maintain a relatively high temperature in the oven, the pinion 32 is turned in a counter clockwise direction in Figure 2 to shift the member 30 and contact strip 27a downwardly from the position shown.

My invention may be applied to automatic water heaters to control ignition of the fuel for heating the water, and to control the fuel to the burner.

My invention is also capable of many other uses as for instance, in electrical refrigerators. This may be accomplished by reversing the thermostat in its support so that a rise in temperature will energize the electric circuits connected thereto for controlling suitable associated refrigerating apparatus.

Various changes may be made in the details of construction and arrangement of parts without departing from the spirit of the invention or the scope of the appended claims.

I claim:—

1. In a thermostatic electric switch, a lever fulcrumed intermediate its ends, spaced contact and insulating members carried by an end of a lever, a thermally responsive device extending between said members, and means for placing the thermally responsive device under an initial tension to electrically engage it with the contact member at room temperatures.

2. In a thermostatic electric switch, a lever fulcrumed intermediate its ends, spaced contact and insulating members carried by an end of a lever, a thermally responsive device extending between said members, and means for placing the thermally responsive device under an initial tension to electrically engage it with the contact member at room temperatures, said thermally responsive device being electrically disengaged from said contact member and engaging said insulation member upon a slight variation in temperature in one direction.

3. In a thermostatic electric switch, a lever fulcrumed intermediate its ends, spaced contact and insulating members carried by an end of a lever, a thermally responsive device extending between said members, means for placing the thermally responsive device under an initial tension to electrically engage it with the contact member at room temperatures, and an electrical contact in the path of movement of the other end of said lever for electrical engagement therewith.

4. In a thermostatic electrical switch, a lever, a yoke on an end thereof, a thermostatic element extending into the yoke and normally electrically engaging a wall thereof, means for placing the thermostatic element under an initial tension to electrically engage it with the said wall, an electrical contact in the path of the other end of said lever for engagement therewith, and means for adjusting said contact with respect to the last named end of the lever to de-energize the circuit in which the contact is connected upon a predetermined variation in temperature.

5. In a thermostatic electric switch, a lever, a yoke on an end thereof, a thermostatic element extending into the yoke and normally electrically engaging a wall thereof, means for placing the thermostatic element under an initial tension to electrically engage it with the said wall, said thermostatic element engaging another wall of the yoke and out of electrical contact therewith upon a slight variation of temperature in one direction, and an electrical contact in the path of the other end of said lever for engagement therewith.

6. In a thermostatic electric switch, a lever, a yoke on an end thereof, a thermostatic element extending into the yoke and normally electrically engaging a wall thereof, means for placing the thermostatic element under an initial tension to electrically engage it with the said wall, said thermostatic element engaging another wall of the yoke and out of electrical contact therewith upon a slight variation of temperature in one direction, and means for adjusting said contact with respect to the last named end of the lever to de-energize the circuit in which the contact is connected upon a predetermined variation in temperature.

7. In a thermostatic electric switch, a lever, a yoke on an end thereof, a thermostatic element extending into the yoke and normally electrically engaging a wall thereof, means for placing the thermostatic element under an initial tension to electrically engage it with the said wall, said thermostatic element engaging another wall of the yoke and out of electrical contact therewith upon a slight variation of temperature in one direction, an electrical contact in the path of the other end of said lever for engagement therewith, and means for adjusting said contact with respect to the last named end of the lever to de-energize the circuit in which the contact is connected upon a predetermined variation in temperature.

8. In a thermostatic electrical switch, a lever, a yoke on an end thereof, a thermostatic element extending into the yoke and normally electrically engaging a wall thereof, means for placing a thermostatic element under an initial tension to electrically engage it with the said wall, an electrical contact in the path of the other end of said lever for engagement therewith, and means for adjusting said contact with respect to the last named end of the lever to de-energize the circuit in which the contact is connected upon a predetermined variation in temperature.

9. In a thermostatic electrical switch, a lever, a yoke on an end thereof, a thermostatic element extending into the yoke and normally electrically engaging a wall thereof, means for placing the thermostatic element under an initial tension to electrically engage it with the said wall, an electrical contact in the path of the other end of said lever for engagement therewith, and means for adjusting said contact with respect to the last named end of the lever to de-energize the circuit in which the contact is connected upon a predetermined variation in temperature, said means including a rack movable with the last named contact, and a pinion geared to said rack and means for rotating said pinion.

10. In a thermostatic electrical switch, a lever, a yoke on an end thereof, a thermostatic element extending into the yoke and normally electrically engaging a wall thereof, means for placing the thermostatic element under an initial tension to electrically engage it with the said wall, and an electrical contact in the path of the other end of said lever for engagement therewith and carried near the last named end of said lever for engaging the lever end with the contact under pressure.

11. In a thermostatic electrical switch, a lever, a yoke on an end thereof, a thermostatic element extending into the yoke and normally electrically engaging a wall thereof, means for placing the thermostatic element under an initial tension to electrically engage it with the said wall, an electrical contact in the path of the other end of said lever for engagement therewith, means for adjusting said contact with respect to the last named end of the lever to de-energize the circuit in which the contact is connected upon a predetermined variation in temperature, and means to limit the adjustment of the contact in either direction.

12. In a thermostatic electric switch a lever, a yoke on an end thereof, a thermally responsive device extending into the yoke, means imparting tension to the thermally responsive device to electrically engage it with a wall of said yoke, an electrical contact in the path of movement of another portion of the lever, and means for adjusting the contact with respect to the other portion of the lever.

13. In a thermostatic electric switch a lever, a yoke on an end thereof, a thermally responsive device extending into the yoke, means imparting tension to the thermally responsive device to electrically engage it with a wall of said yoke, an electrical contact in the path of movement of another portion of the lever, and means for adjusting the contact with respect to the other portion of the lever, said last named means including a slidable member carrying said contact, and a member engageable with the slide for operating the same.

In testimony whereof, I hereunto affix my signature this 24th day of March, 1930.

GEORGE HERBSTER.